United States Patent [19]

Collins

[11] Patent Number: 5,498,861
[45] Date of Patent: Mar. 12, 1996

[54] SENSING HEAD FOR CODE READING HAVING MULTIPLE REPLACEABLE SENSORS

[75] Inventor: Paul D. Collins, Wendell, N.C.

[73] Assignee: Square D Company, Palatine, Ill.

[21] Appl. No.: 958,149

[22] Filed: Oct. 8, 1992

[51] Int. Cl.$^6$ .............................. G06F 19/00; G06K 7/00
[52] U.S. Cl. ............................................. 235/440; 235/439
[58] Field of Search .................................. 235/440, 447, 235/460, 453, 435, 472, 449, 444, 439; 349/750; 439/893, 890; 198/866; 361/359; 324/173; 73/861.24; 248/500, 27.3, 224.3

[56] References Cited

U.S. PATENT DOCUMENTS

| 4,343,451 | 8/1982 | Armstrong | 248/500 |
| 4,679,445 | 7/1987 | Knudsen | 73/861.24 |
| 4,801,789 | 1/1989 | Davis | 235/472 |
| 5,006,797 | 4/1991 | Smith | 324/173 |
| 5,157,245 | 10/1992 | Shigeno | 234/449 |

Primary Examiner—Donald T. Hajec
Assistant Examiner—Jeffrey R. Filipek
Attorney, Agent, or Firm—Larry I. Golden; David Russell Stacey; Larry Shrout

[57] ABSTRACT

A code reading device for use in an industrial flexible automation track system is disclosed wherein a code reading device reads codes stored in a code storing device attached to a work piece carrier. The code reading device includes a multiple sensor sensing head in which any one or all of the enclosed sensors may be easily replaced. Each sensor is slidably received within a pocket in the sensing head and provided with a plug-on electrical connector such that it may be easily replaced should a failure occur or should a different type of sensor be required.

1 Claim, 5 Drawing Sheets

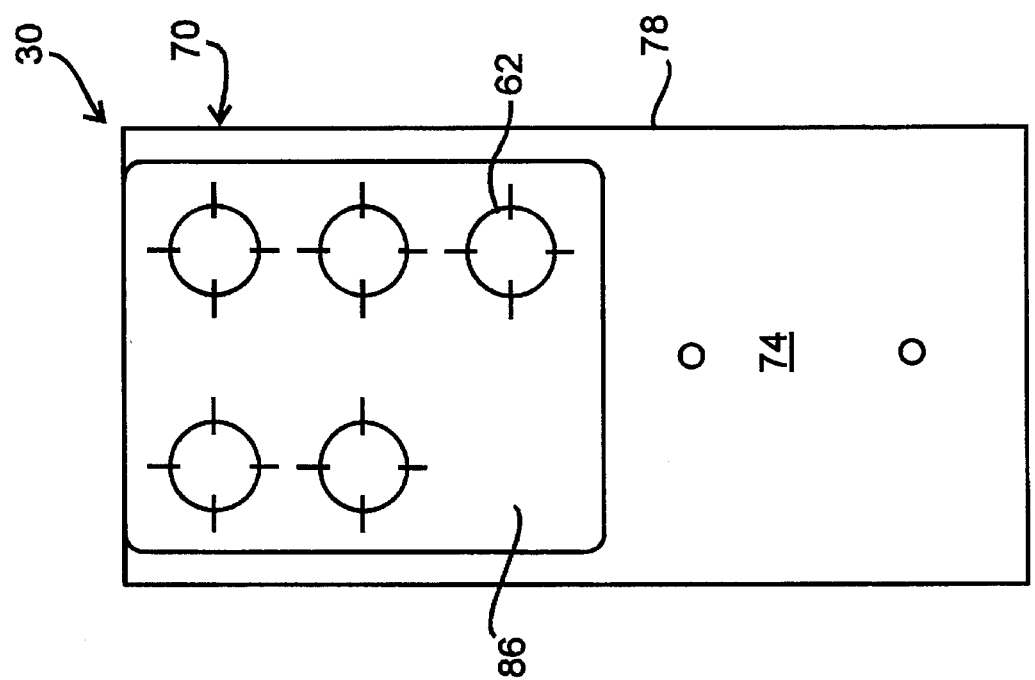
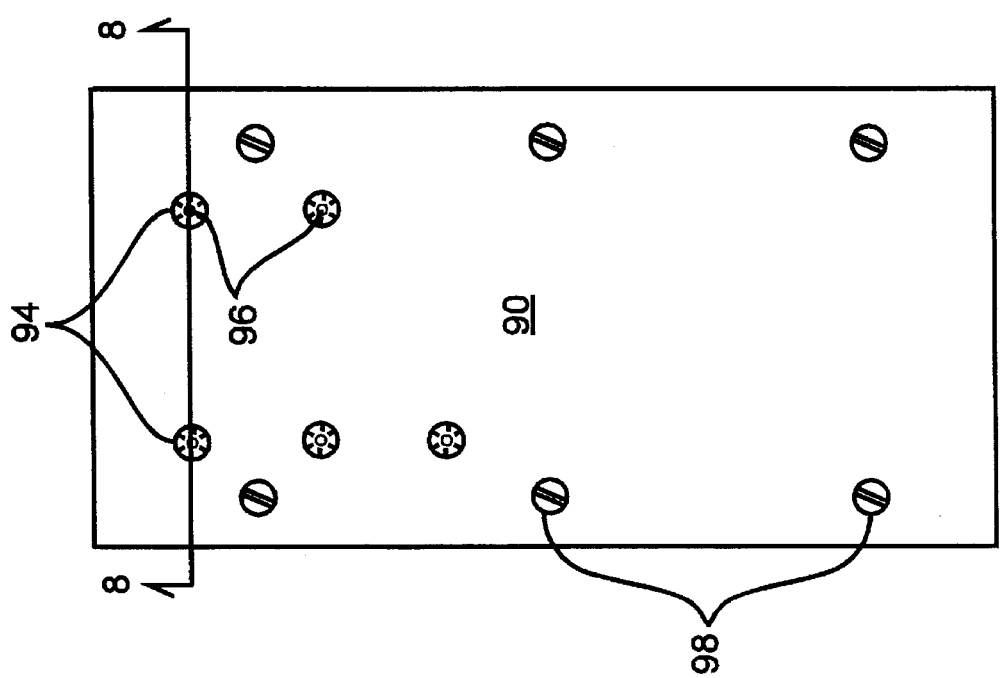

5,498,861

SENSING HEAD FOR CODE READING HAVING MULTIPLE REPLACEABLE SENSORS

FIELD OF THE INVENTION

The present invention relates to the field of electronic sensing devices and more specifically to sensing heads having multiple sensors for detecting a series of targets which may be preset to form a code.

BACKGROUND OF THE INVENTION

It is common practice in industrial flexible automation assembly lines to have a work piece on a work piece carrier move along a track from one work station to another. At different work stations along the track, the work piece carrier will stop to allow an operation to be performed on the work piece. A system of code storing devices attached to the work piece carrier and code reading devices (sensing heads) placed along the track near each work station indicates to the flexible automation system the work stations at which an operation is to be performed.

Each sensing head has a plurality of sensors arranged in a particular alignment to detect any one of a plurality of codes stored in a code storing device placed on the work piece carrier. The sensing head is normally constructed by hard wiring the sensors to a printed circuit board, placing the sensors inside a housing in the particular alignment required, and then filling the housing with a potting compound to permanently fix the sensors in their preset alignment. The potted sensors cannot be removed from the housing. If a sensor should fail or should a different type (N.C., N.O., PNP, NPN, DC, or AC) of sensor be required in any one of the sensor positions, a new sensing head must be purchased. This is a significant cost to the customer in labor, equipment down time, and additional sensing heads.

SUMMARY OF THE INVENTION

In the present invention, a sensing head for multiple sensors has a plurality of pockets, each properly aligned to match a target on a code storing device. Each pocket snugly receives an individual sensor. The sensor may be easily removed for replacement if defective or should a different sensor type (N.C., N.O., PNP, NPN, or AC) be desired at a particular location. Each sensor also has a connecting wire with a plug on terminal which is easily connected to the sensing head printed circuit board.

Other features and advantages of the invention will become apparent to those skilled in the art upon review of the following detailed description, claims and drawings.

BRIEF DESCRIPTION OF THE DRAWING

FIG. 4 is a view of a front of the sensing head of a code reader constructed in accordance with the present invention.

FIG. 5 is a view of the sensing head closing plate of a code reader constructed in accordance with the present invention.

Figure 1:
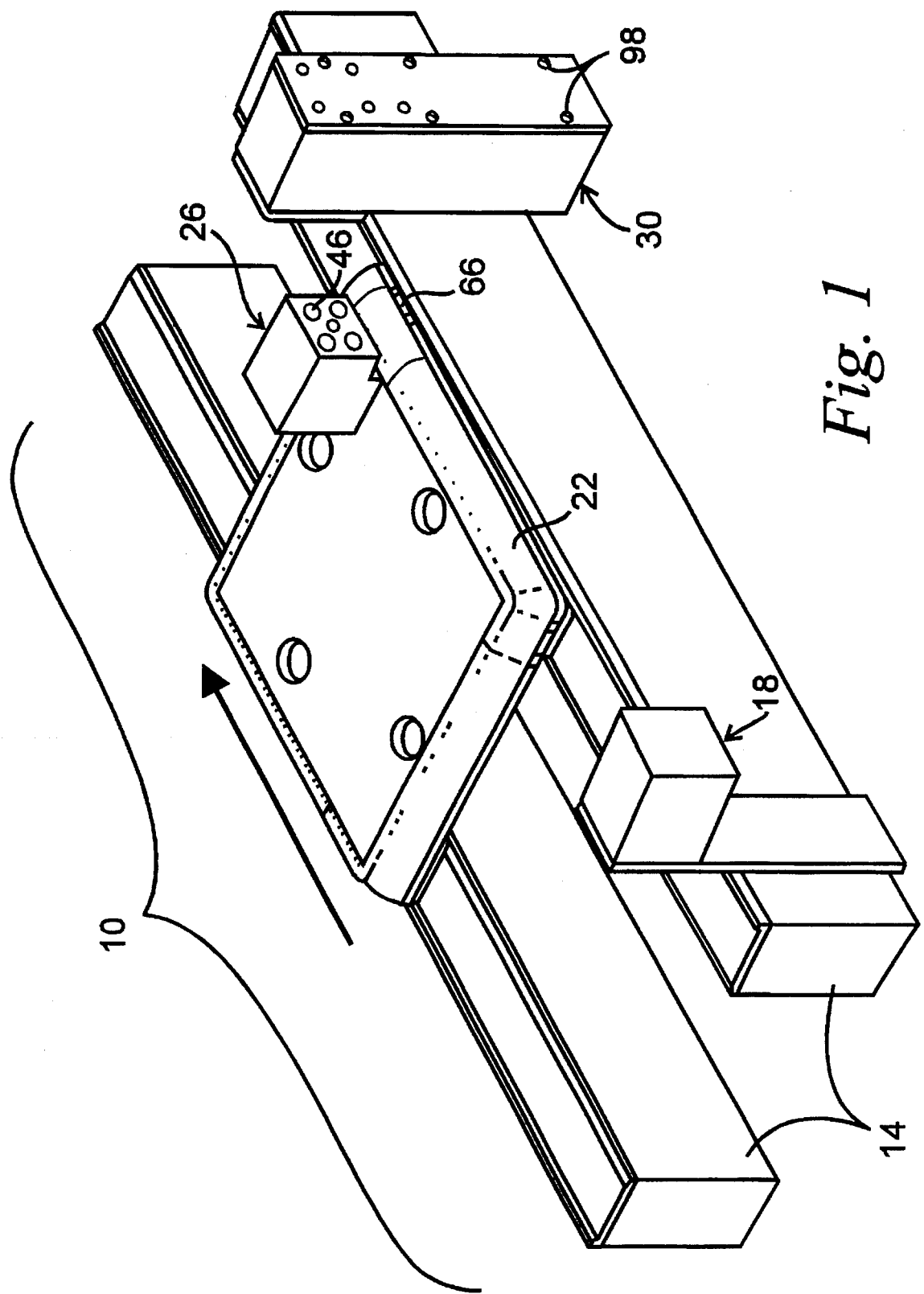
FIG. 1 shows a typical flexible automation assembly line employing a track, a code setter, a work piece carrier with a code memory unit attached, and a code reader constructed in accordance with the present invention.

It is to be understood that the invention is not limited in its application to the details of construction set forth in the description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

A portion of a flexible automation system is generally indicated by reference numeral 10 of FIG. 1. The automation system 10 includes a track 14, a plurality of code setting devices 18, a work piece carrier 22, a code storing device 26, and a plurality of code reading devices 30. The code setting devices 18 are mounted along the side of the track 14 at various locations. As the work piece carrier 22 moves along the track 14, it passes the code setting device 18 where a code is entered into the code storing device 26 mounted on the work piece carrier 22. The code may also be entered manually if desired. The code indicates the next operation to be done on the work piece or the next work station at which the work piece must stop. A code reading device 30 is mounted along the side of the track 14 at or near each work station such that it may read the code stored in the code storing device 26 and either initiate the operation indicated or pass the work piece carrier 22 on to the next work station. If an operation is performed at the work station, a code setting device 18 may enter a new code into the code storing device 26 to indicate the next operation or work station for the work piece. A code may also be entered to indicate a defective work piece and thereby prohibit any further operations from being performed on that work piece.

Figure 2:
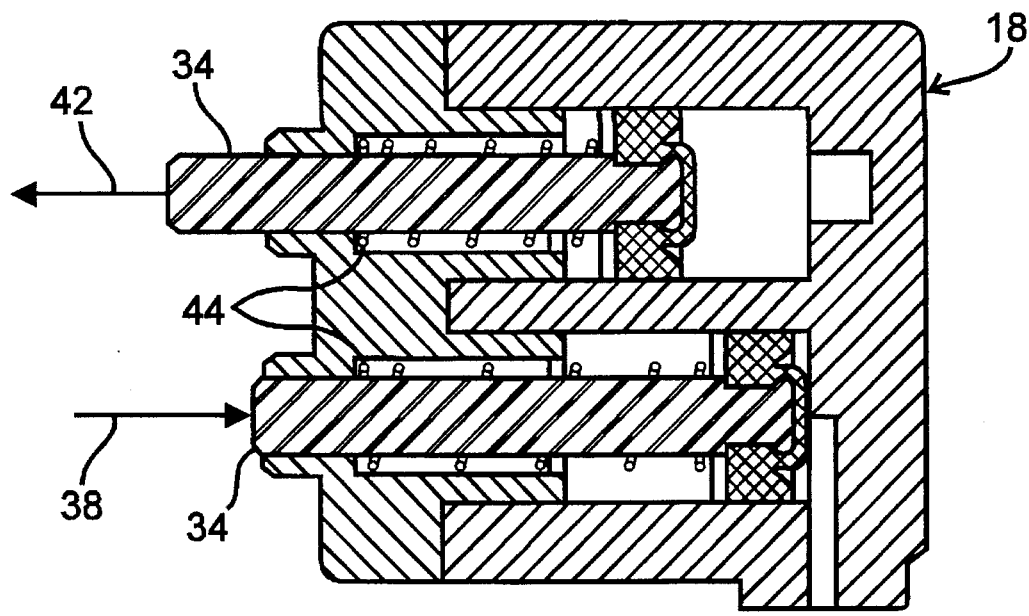
FIG. 2 is a cross-sectional view of a typical code setting device.

The code setting device 18, as shown in cross-section in FIG. 2, employs air pressure or an electric solenoid to move a plunger 34 from an inner position 38 to an outer position 42. Each plunger 34 has a return spring 44 which forces it back the inner position 38 when the air pressure or electricity is removed. A plurality of these plungers 34 are arranged in a particular order in the code setting device 18 and each may be selectively activated.

Figure 3:
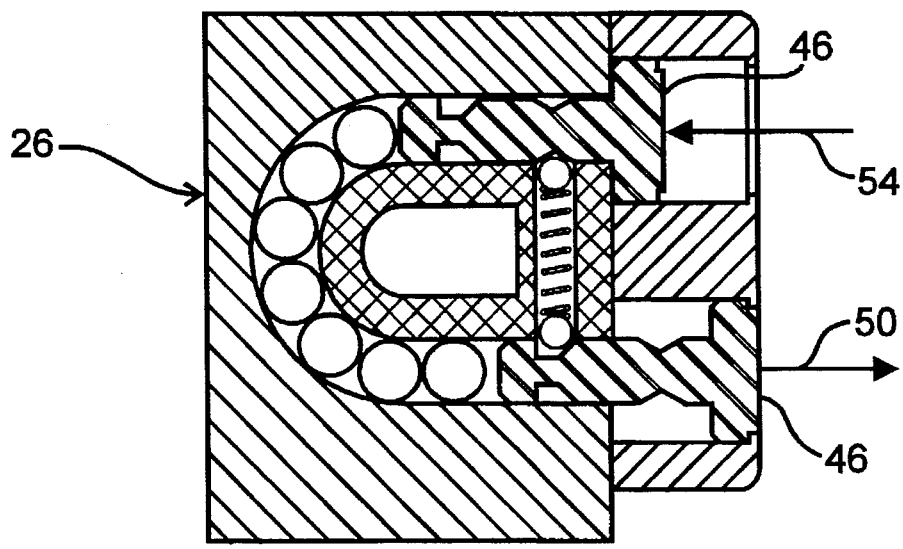
FIG. 3 is a cross-sectional view of a typical code storing device.

The code storing device 26, as shown in cross-section in FIG. 3, has a plurality of targets 46 made from a material easily detected by the code reading device 30. Each target 46 in the code storing device 26 is arranged to correspond with one of the plungers 34 in the code setting device 18. To store a code in the code storing device 26, a target 46 must be aligned and in close proximity with its corresponding plunger 34 in the code setting device. The targets 46 are movable between a sensing position 50 and a non-sensing position 54 by the interaction of the plunger 34. When the plunger 34 is moved to its outer position 42, the corresponding target 46 is moved to its non-sensing position 54. The targets 46 are arranged in pairs which are connected such that one target 46 of the pair is in the sensing position 50 while the other is in the non-sensing position 54. A pair of targets 46 may be manually set such that both targets 46 are in the same position simultaneously.

Figure 6:
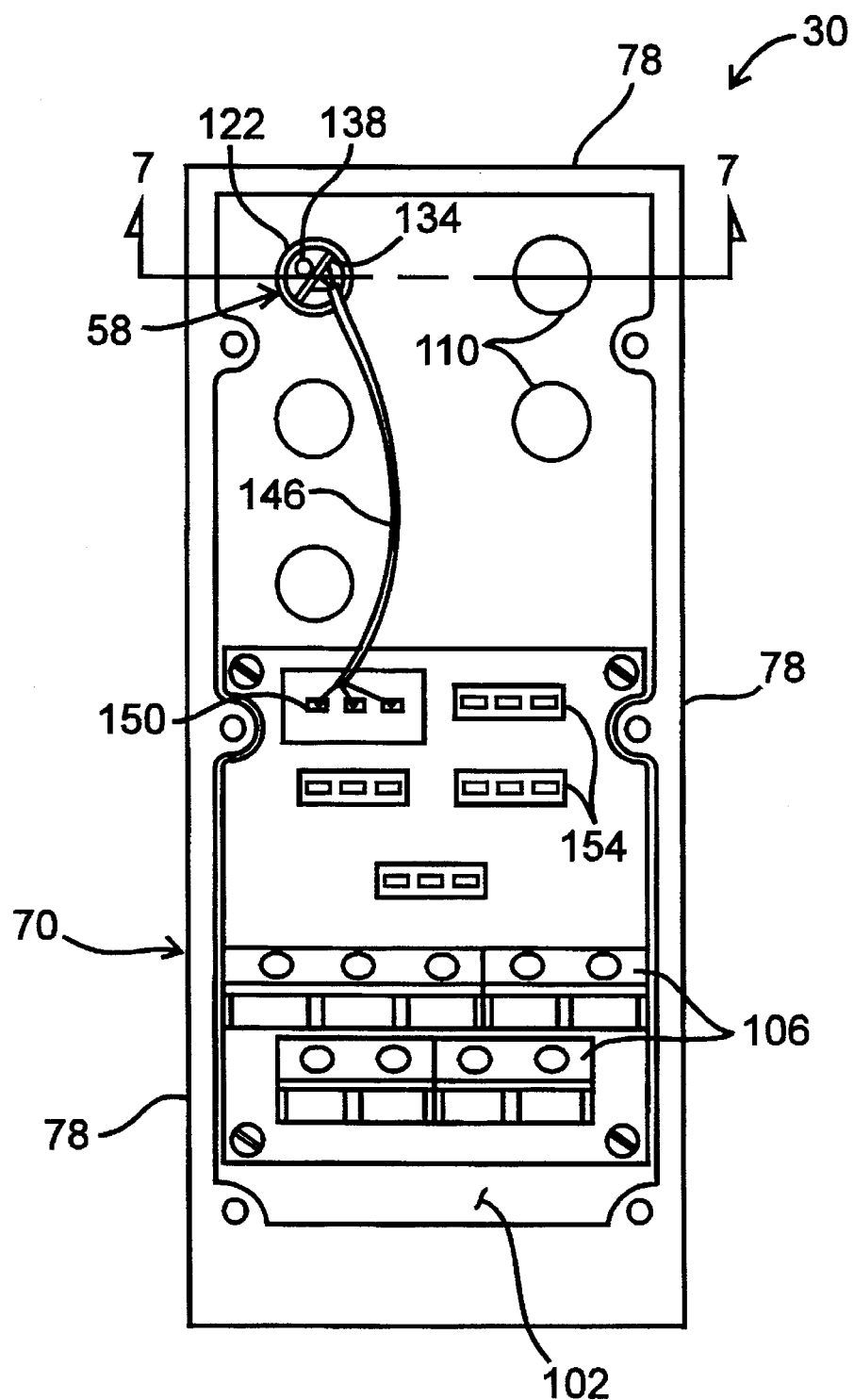
FIG. 6 is a view of the inside of the sensing head from the back with one of the replaceable sensors installed in a code reader constructed in accordance with the present invention.

Referring to FIG. 1, the code reading devices 30 are mounted along the side of the track 14 at or near a work station. Referring to FIG. 6, each code reading device 30 has a sensor 58 for each target 46 in the code storing device 26. An additional alignment sensor, positioned behind the indicia 62, as shown in FIG. 4, may also be provided to detect an alignment target 66 mounted on the work piece carrier 22. The alignment target and sensor provide a means of indicating to the code reading device 30 that the targets 46 of the code storing device 26 are properly aligned with the sensors 58 of the code reading device 30. This prevents the code reading device 30 from sensing false targets. The sensing range of the sensors 58 is very short (less than 10 mm), therefor the targets 46 and sensors 58 must be in close proximity and properly aligned for detection to occur.

Figure 7:
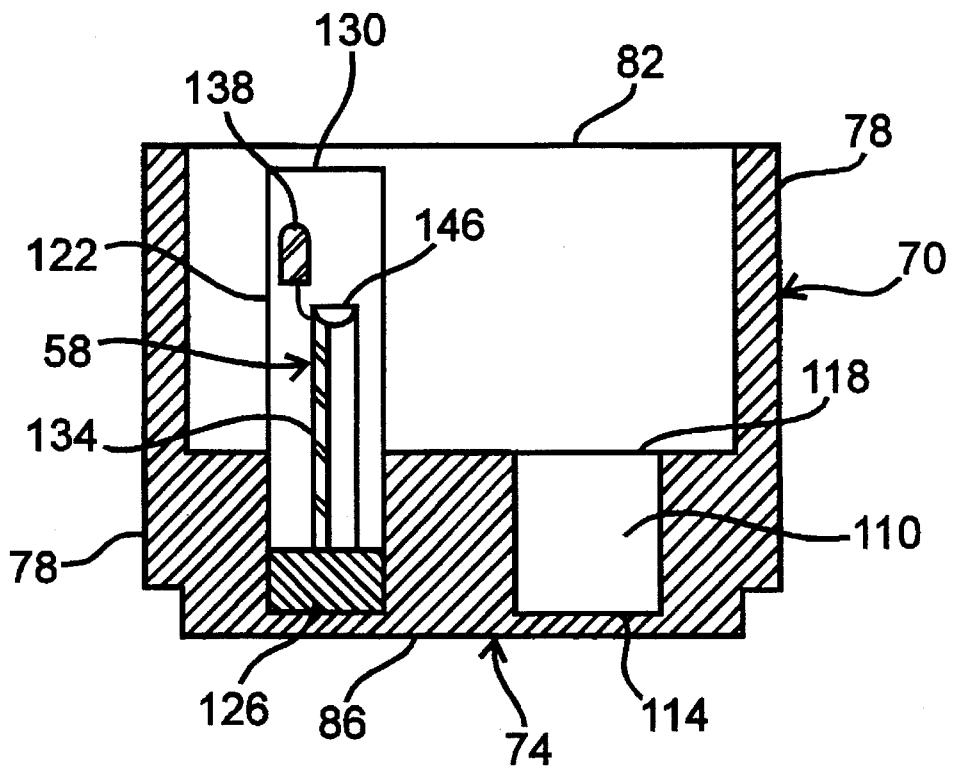
FIG. 7 is a cross-sectional view of the sensing head of the present invention taken along line 7—7 of FIG. 6.
Figure 8:
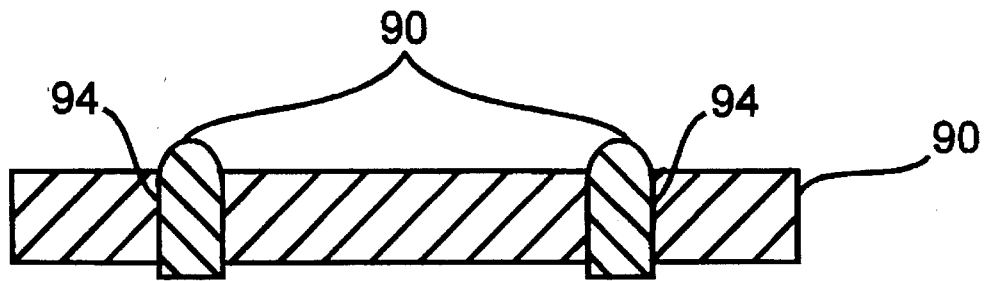
FIG. 8 is a cross-sectional view of the sensing head closing plate taken along line 8—8 of FIG. 5 showing the light pipes installed.

Referring to FIG. 4, each code reading device 30 has a rectangular box-like enclosure 70 molded from a material which does not adversely effect the sensitivity of the sensors 58. The enclosure 70 has a front wall 74 and four side walls 78 which are generally perpendicular to the front wall 74 and to each other. The front wall 74 and side walls 78 define a hollow interior. An open rear side 82 opposite the front wall 74 provides access to the hollow interior. The front wall 74 of the enclosure 70 has a generally flat outside surface 86 which faces the targets 46 of the code storing device 26 when they are aligned with one another along the track 14 of a flexible automation system 10. A closing plate 90 covers the open rear side 82 of the enclosure 70 and has holes 94 into which light pipes 96 can be pressed, as shown in FIG. 8. A thin rubber-like gasket (not shown) is placed between the closing plate 90 and the open side 82 of the enclosure 70 to seal the enclosure against the ingress of dust and liquids. The closing plate 90 is attached to the enclosure 70 by screws 98, as shown in FIG. 1, and may be removed to provide access to the sensors 58, a printed circuit board 102, and a plurality of wire binding terminals 106 enclosed within the enclosure 70. Referring to FIG. 7, each sensor 58 is closely received within a pocket 110 integrally formed in a rear portion of the front wall 74 of the enclosure 70. The pockets 110 are dimensioned to closely receive the sensors 58 in a preselected alignment, usually with their longitudinal axis perpendicular to the front wall 74. Each pocket 110 has a first end 114 which is closed by the outside surface 86 of the front wall 74 and a second end 118 which is open to the hollow interior.

Each sensor 58 normally has a generally cylindrical enclosure 122 with a sensing end 126 which is closed and a terminal end 130 which is open. The enclosure 122 provides support and protection for a printed circuit board 134 on which the sensor electronics and a LED 138 are mounted. The LED 138 indicates the status of the sensor 58 by emitting light when a target 46 is detected. The sensor 58 is inserted into the pocket 110 until the sensing end 126 abuts the first end 114. The terminal end 130 will then be approximately even with the side walls 78 of the enclosure 70 at the open side 82. When the closing plate 90 is installed, it prevents the sensor 58 backing out of the pocket 110. The light pipes 96 extend slightly into the terminal end 130 of the sensor enclosure 122 such that they may conduct light emitted by the LED 138 when the sensor detects a target 46. A multiple conductor cable 146 is electrically connected to the printed circuit board 134 of the sensor 58 and passes out through the open terminal end 130. Referring to FIG. 6, the cable 146 has a quick connect plug-on connector 150 at its free end. The plug-on connector 150 is plugged on to a mating plug-on connector base 154 mounted on the printed circuit board 102. The wire binding terminals 106, also mounted on the printed circuit board 102, are electrically connected to the plug-on connector bases 154. The wire binding terminals 106 provide a means for connecting an external power source to the sensors 58 and for connecting the sensor 58 output to external wiring.

Since the sensors 58 are not permanently fixed in the enclosure 70 by potting or other means, they may be easily removed should one become inoperative, or should the type (N.C., N.O., PNP, NPN, or AC) of any one or all of the sensors 58 need to be changed for a particular function.

I claim:

1. A sensing head, of the type used in a code reading device of a flexible automation assembly line, adapted to house a plurality of sensors for sensing the position of a target carried by a code storing device of a flexible automation assembly line, and generating a corresponding output signal, the sensing head comprising:

a plurality of sensors, each comprising sensor electronics and a sensor enclosure which supports said sensor electronics;

an enclosure having a plurality of pockets defined in a front portion of said enclosure, each of said pockets being dimensioned for securely yet removably receiving said sensor enclosure of one of said plurality of sensors in a preselected alignment;

each of said pockets being integrally formed within said front portion of said enclosure and dimensioned such that a sensor can be removably positioned therein by frictional engagement between said sensor enclosure and said pocket.

\* \* \* \* \*